United States Patent
Geisel

[11] 3,876,231
[45] Apr. 8, 1975

[54] SECTIONAL VELOCIPEDE

[76] Inventor: Anthony Geisel, 5219 N. Spaulding St., Chicago, Ill. 60625

[22] Filed: Jan. 18, 1973

[21] Appl. No.: 324,886

[52] U.S. Cl.............................. 280/278; 280/287
[51] Int. Cl............................................ B62k 15/00
[58] Field of Search ............ 280/278, 287; 403/339, 403/378, 379

[56] References Cited
UNITED STATES PATENTS

| | | | |
|---|---|---|---|
| 604,743 | 5/1898 | Evans | 280/287 |
| 620,833 | 3/1899 | Belcher et al. | 403/379 |
| 1,132,375 | 3/1915 | Myers | 403/379 |
| 2,211,164 | 7/1940 | Rippenbein | 280/287 |
| 2,746,769 | 5/1956 | Hoogendoorn | 280/287 |
| 2,846,248 | 7/1958 | Kliwer | 403/379 |

*Primary Examiner*—Robert J. Spar
*Assistant Examiner*—Ross Weaver

[57] ABSTRACT

A sectional velocipede is provided which includes a sectional frame interconnecting a seat, steering means and wheels. The frame has front and rear sections provided with elongated support members which carry complemental connecting means for securing the support members in abutting aligned relation.

2 Claims, 6 Drawing Figures

PATENTED APR 8 1975

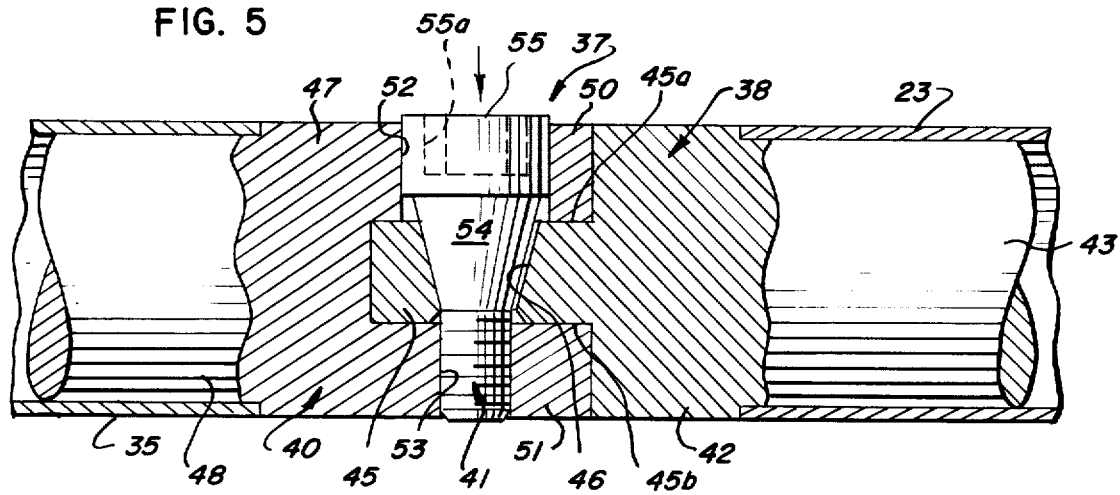
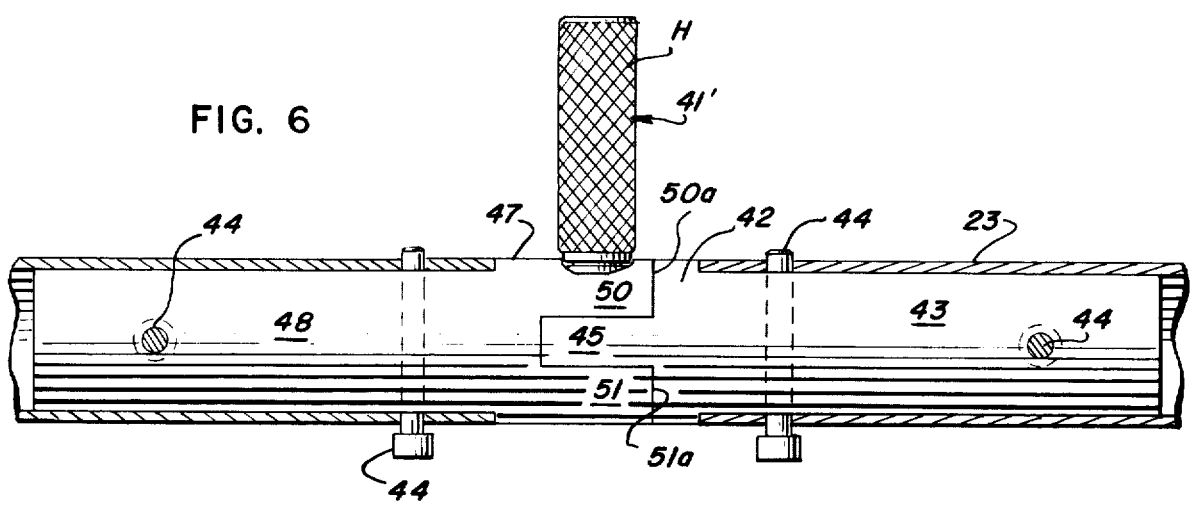
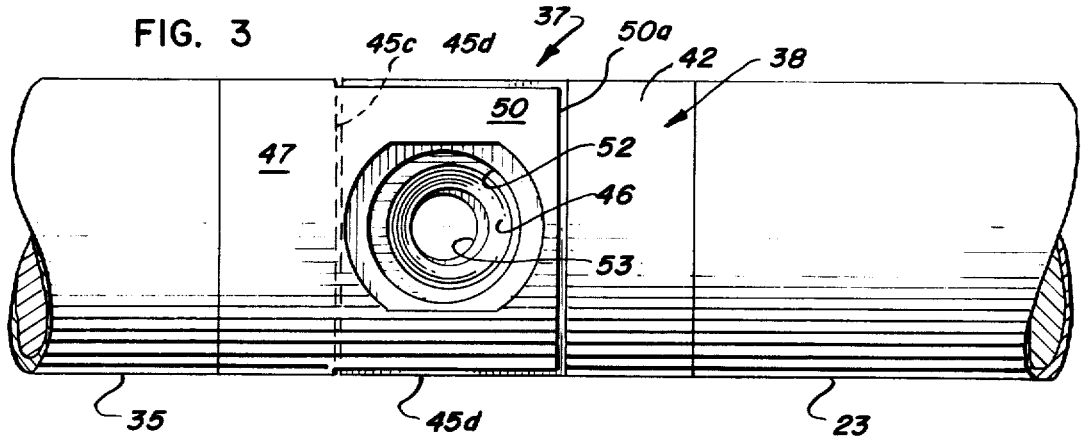

SECTIONAL VELOCIPEDE

BACKGROUND OF THE INVENTION

Various velocipedes having sectional frames have heretofore been provided; however, because of certain design characteristics they have been beset with one or more of the following shortcomings: (a) assembly and disassembly of the frame was an awkward and difficult manipulation; (b) the connection between the frame sections was bulky and unattractive, and oftentimes was hazardous to the wearing apparel of the rider; (c) the connection between the frame sections was weak and ineffective; and (d) the connection between the frame sections was of expensive, complex construction and required numerous components which were readily susceptible to becoming lost.

SUMMARY OF THE INVENTION

Thus, it is an object of the invention to provide a velocipede having a sectional frame which avoids the aforenoted shortcomings associated with prior art structures.

It is a further object of the invention to provide a velocipede having a sectional frame wherein the connection for the frame sections may be readily disassembled, when desired, by the removal of a single component thereby rendering the velocipede inoperative; said component, when removed, being readily carried by the rider and, thus, discouraging theft of the velocipede when it is in a disassembled inoperative state.

It is a still further object of the invention to provide a connection which enables an existing unitary frame of a velocipede to be readily tranformed into a sectional frame without interfering with the normal operating mechanism of the velocipede.

It is a still further object of the invention to provide a sectional frame for a velocipede which will not adversely affect the structural strength of the frame, nor add any significant weight or bulk to the frame.

Further and additional objects will appear from the description, accompanying drawings and appended claims.

In accordance with one embodiment of the invention, a velocipede is provided which includes a seat, a steering means, wheels, propelling means, and a sectional frame interconnecting same. Each section of the frame is provided with at least one elongated support member. The support members are interconnected in aligned abutting relation by complemental connecting means. One component of the connecting means is an elongated tongue unit which is mounted on and extends longitudinally from one support member. A transversely extending tapered hole is formed in the tongue unit. A second component of the connecting means is a bifurcated piece which is mounted on the other support member and has a pair of spaced elongated branches extending longitudinally therefrom. The branches are provided with aligned transversely extending openings. One of the openings is smaller than the other. One end of the tongue unit is adapted to be sandwiched between the branches so that the hole and openings are in registered relation. A third component of the connecting means is a pintle which is removably mounted within the registered hole and openings. The pintle is provided with a tapered shank portion which coacts with the tapered hole, when the pintle is being inserted therein, to cam the tongue unit and bifurcated piece into aligned, abutting, affixed relation.

DESCRIPTION

For a more complete understanding of the invention, reference should be made to the drawings wherein:

FIG. 3 is an enlarged fragmentary top view of one form of the connecting means for the frame sections, but showing the pintle removed and the hole and openings of the tongue unit and bifurcated piece in registered, but offset relation;

FIGS. 4 and 5 are fragmentary side elevational views, partially in section, of the connecting means of FIG. 3 showing the pintle in partially and fully assembled relation with respect to the tongue unit and bifurcated piece; and FIG. 6 is similar to FIG. 5 but showing a modified form of pintle.

Figure 1:
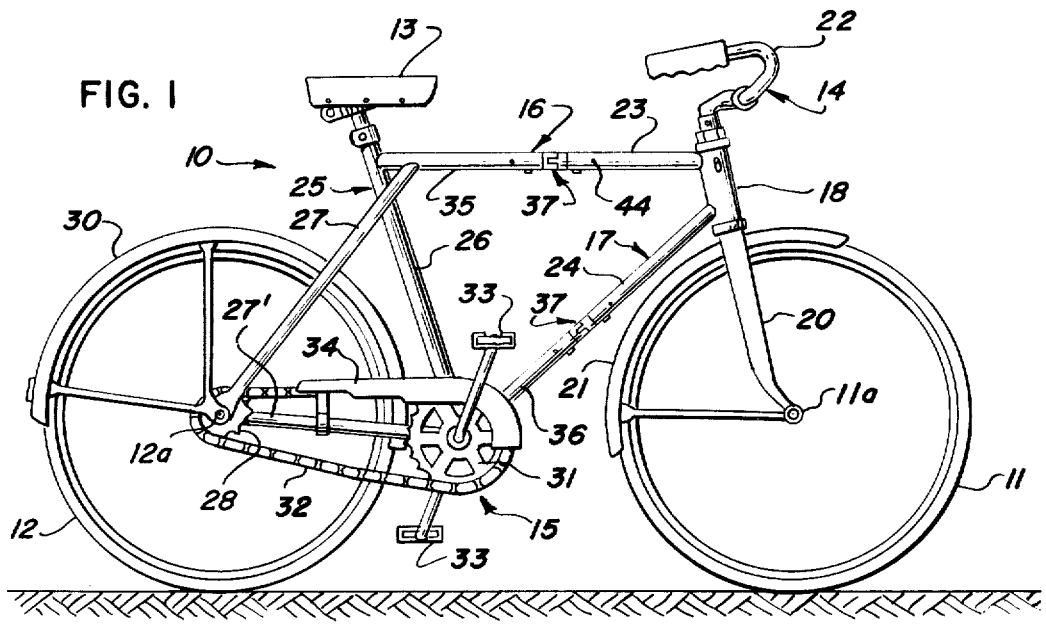
FIG. 1 is a side elevational view of one form of the improved velocipede with the frame thereof in assembled relation.

Referring now to the drawings and more particularly to FIG. 1, one form of an improved velocipede 10 is shown which includes front and rear wheels 11 and 12, a seat 13, a steering mechanism 14, propelling mechanism 15 and a sectional frame 16. The frame 16 includes a front section 17 which is provided with a steering column 18 and a fork member 20 depending therefrom and engaging the hub 11a of the front wheel. A fender 21 may be provided which partially encompasses the front wheel and is secured to the lower end of the steering column. Adjustably connected to the upper end of column 18 is a handle bar 22 of conventional design. Extending rearwardly from the column 18 is a pair of elongated tubular support members 23 and 24. In certain types of velocipedes, only a single support member may extend from the steering column.

The frame 16 is also provided with a rear section 25 which includes an upwardly extending post 26 on the upper end of which is adjustably mounted the seat 13. A rearwardly and downwardly extending fork 27 and rearwardly extending brace 27' are also provided on the rear section 25. The fork and brace are adapted to engage the hub 12a of the rear wheel. Also, mounted on the wheel hub is a sprocket 28, which forms a component of the propelling mechanism 15. A fender 30 may be secured to the fork 27 and brace 27' so as to partially encompass the rear wheel 12. Rotatably mounted on the lower end of post 26 is a manually actuated drive sprocket 31 which is connected by an endless chain 32 to the wheel sprocket 28. Conventional pedals 33 are provided for enabling manual force to be applied to the drive sprocket 31. A leg guard 34 may be secured to the rear frame section and partially overlie the upper segment of the endless chain 32.

Extending forwardly from the upper end of post 26 is a tubular support member 35 which is aligned with and connected to the end of support member 23. A second tubular support member 36 extends forwardly and upwardly from the lower end of post 26 and is aligned with and connected to the end of the support member 24 of front frame section 17.

The corresponding support members of the frame sections are secured to one another by complemental connecting means 37. Each connecting means is of like construction and one such connecting means is shown more clearly in FIGS. 3–5. The illustrated embodiment of the connecting means comprises three basic components; a tongue unit 38, a bifurcated piece 40, and a pintle 41.

The tongue unit 38 is preferably formed from bar stock material and includes a central portion 42 having an exterior configuration which closely approximates the exterior configuration of the support member 23, 24, 35 or 36 to which it is attached. Extending longitudinally from one side of the central portion is a pluglike end portion 43 which is of reduced dimension and is adapted to be inserted into the end of the support member. The inserted end 43 of unit 38 is retained in assembled relation with the support member by one or more lock screws 44 which are threaded transversely into the support member and into or through the end portion, see FIGS. 1 and 2. Extending longitudinally from the opposite end of the central portion 42 is an elongated tongue element 45 which is provided with a tapered hole 46 having the axis thereof transversely disposed relative to the longitudinal axis of the support member. The tongue element has flattened top and bottom surfaces 45a and b. The outer or distal end 45c of the tongue element is squared, as seen in FIG. 3. The exposed opposite side surfaces 45d of the tongue element are slightly rounded so as to conform to the curvature of the exterior configuration of the central portion 42.

The bifurcated piece 40 is preferably formed of bar stock material and is likewise provided with a central portion 47 and a pluglike end portion 48 similar to that of tongue unit 38. The opposite or exposed end of piece 40 is provided with a pair of spaced, substantially parallel, longitudinally extending branches or fingers 50 and 51. The spacing between the branches conforms substantially to the thickness of the tongue element 45 so that the latter will snugly fit therein. The branches are provided with openings 52 and 53 which are coaxially aligned and transversely disposed with respect to the longitudinal axis of the support member. Opening 52 has a larger diameter than opening 53 and the latter, in the illustrated embodiment, is provided with internal threads. Prior to the pintle 41 being fully assembled, as seen in FIG. 5, the axes of the tapered hole and the openings are offset with respect to one another, as seen in FIG. 3, for reasons to be hereinafter discussed.

Figure 4:
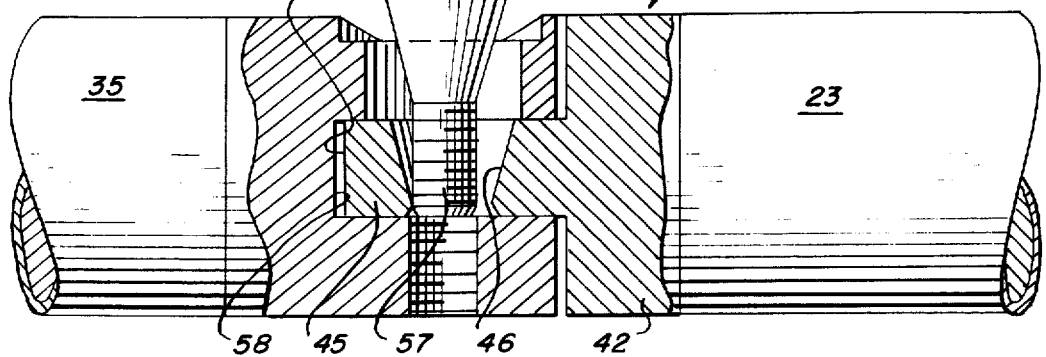

The pintle 41, as shown in FIGS. 4 and 5, has a tapered center shank portion 54, the taper of which closely approximates the taper of the hole 46 formed in the tongue element 45. The upper or head end 55 of the pintle is enlarged and is provided with a recess 55a to accommodate the end 56 of an Allen wrench W or the like. When the pintle 41 has been fully assembled, the head end 55 thereof is almost, or completely accommodated within the opening 52 formed in branch 50. The opposite or lead end 57 of the pintle is adapted to be threaded into opening 53 formed in branch 51.

As the pintle 41 is threaded into the opening 53, the tapered center shank portion 54 will bear against the offset tapered wall surface defining opening 46 and cam the tongue element 45 in a left hand direction relative to the bifurcated piece, as seen in FIGS. 3 and 4, until the squared end 45c abuts a flattened surface 58 formed between the branches 50 and 51. The ends 50a and 51a of the branches are also squared and simultaneously abut an end surface of the central portion 42 of the tongue unit. Because the abutting surfaces 45c, 50a, 51a, and 58 are flattened, the tongue unit 38 and bifurcated piece 40 will remain in fixed, longitudinally aligned relation. The pintle, when in assembled relation, prevents longitudinal separation of the corresponding support members.

Figure 2:
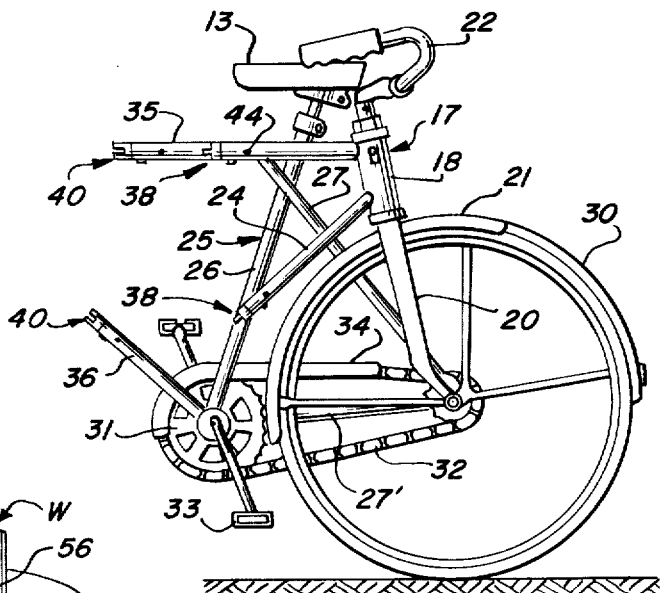
FIG. 2 is similar to FIG. 1 but showing the frame thereof disassembled and the velocipede in condition for storage.

Once the pintle is removed from both the connecting means 37 for the support members 23–35 and 24–36, the front frame section 17 and the rear frame section 25 may be readily separated from one another, thereby rendering the velocipede 10 inoperative. As seen in FIG. 2, the separated frame sections may be readily positioned in side-by-side relation for compact storage. As an anti-theft measure, when the velocipede is being parked in an unprotected area, the pintle 41 may be removed and carried by the rider so that the velocipede is rendered inoperative. As a further precautionary set, the separated frame sections can be chained together to a stanchion or the like.

Because the entire propelling mechanism is carried by the rear frame section 25, no difficulty is encountered in assembling or disassembling the frame 16 and the operating mechanism of the velocipede is not disturbed.

FIG. 6 shows a modified pintle 41' in which the head end 55' thereof is provided with an integral, elongated, exposed handle H. Thus, with pintle 41', no wrench or other tool is required to tighten or loosen the pintle. Where the modified pintle is being used, the tongue unit 38 and bifurcated piece are positioned in their respective support members so that the handle H will extend downwardly or in such a direction so as not to obstruct the person while operating the velocipede.

While the tongue unit and bifurcated piece are shown as having pluglike end portions which are inserted into the adjacent ends of the support member, such pluglike end portions can be substituted with sleeve-like ends, not shown, which would be sized so as to snugly encompass the ends of the corresponding support members. Furthermore, if desired, the pintle can include lock means, not shown, which would require a special key or implement to be inserted into the exposed end of the pintle in order to turn the latter so that it can be disassembled from the hole and openings.

While the velocipede is shown as a bicycle, the invention is not limited thereto, but instead may be incorporated in tricycles or the like.

I claim:

1. A sectional velocipede comprising a seat, steering means, wheels, and a sectional readily separable frame for interconnecting same; said frame including a front section on which said steering means and at least one wheel are mounted, said frame front section having at least one rearwardly extending elongated support member, and a rear section on which said seat and at least one wheel are mounted, said frame rear section having at least one forwardly extending elongated support member; and connecting means removably securing said support members in assembled longitudinally aligned relation, said connecting means having complemental components fixedly secured to said support members, one component including a tongue unit projecting axially from one support member and having a flattened end face, said tongue unit being provided with an annularly tapered transversely extending hole spaced from the end face, one end of the hole terminating at one side surface of the tongue unit and having a larger diameter than the opposite end of the hole terminating at the opposite side surface of the tongue unit, and a second component of said connecting means including a bifurcated piece having a pair of spaced elongated branches projecting longitudinally from the other support member and having the ends of said branches adjacent said other support member interconnected by a portion having an exposed flattened surface, said branches provided with aligned, transversely extending openings spaced from the exposed flattened surface of the bifurcated piece a distance substantially equal to the distance the hole is spaced from the end face of said tongue unit, the opening in one branch having a greater diameter than the opening in the other branch, said tongue unit being sandwiched between said branches whereby said hole is in registration with said openings, said opposite end of said tapered hole being of larger diameter than the opening in said other branch and being ajdacent said other branch, the tongue unit being in a snug sliding relation with said branches when said complemental components are being assembled together, a pintle removably disposed within said registered hole and openings and threaded into one of said openings to effect interlocking of said connecting means components in assembled relation, said pintle having an annularly tapered shank portion which co-acts with said tapered hole, when said pintle is moved into assembled relation with said components, to cam the latter towards one another whereby the flattened end face of said tongue unit moves into abutting relation with the flattened surface of the portion of the bifurcated piece whereby said support members assume an aligned end to end fixed inflexible relation; said connecting means components, when in assembled relation, having an exterior configuration substantially corresponding to the exterior configuration of the adjacent support members.

2. The sectional velocipede of claim 1 wherein said frame front section includes a pair of elongated rearwardly extending support members and said frame rear section includes a pair of elongated forwardly extending support members, corresponding support members of said pairs being disposed in longitudinally aligned relation and provided with connecting means having complemental components; one component of each connecting means being a bifurcated piece, both support members of one frame section having fixedly mounted thereon said bifurcated pieces whereby corresponding open sides of said pieces face in substantially the same relative direction with respect to the connected frame sections, said bifurcated pieces being adapted to slidably accommodate tongue units fixedly mounted on the support members of the other frame section, pintles for retaining the components of the connecting means in assembled relation, assembly or disassembly of said frame sections being effected upon simultaneous transverse movement of one frame section relative to the other in the direction of the corresponding open sides of said bifurcated pieces when the pintle of each connecting means is in disassembled relation with respect to the tongue unit.

* * * * *